A. L. DARBY.
Harvester.
No. 37,253.  Patented Dec. 23, 1862.
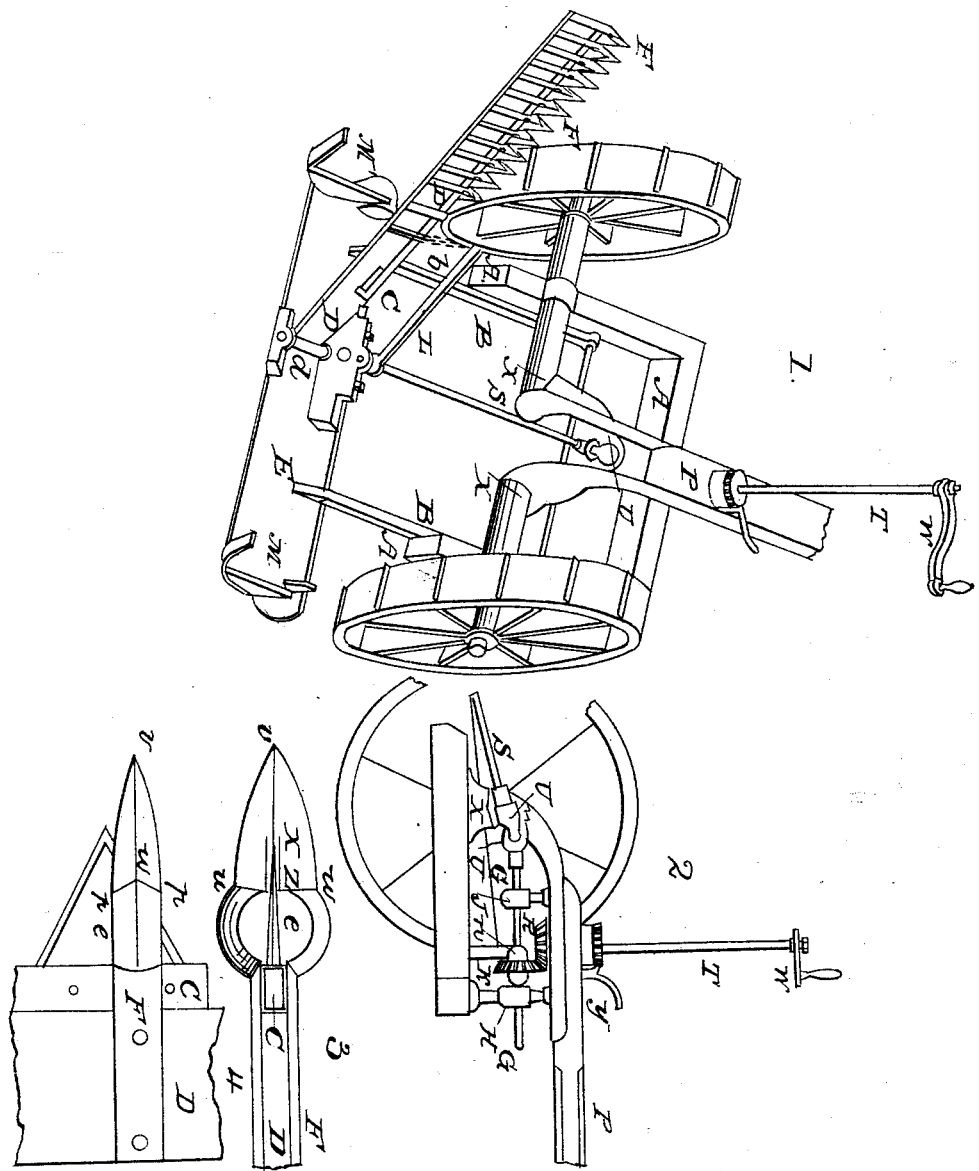
Witnesses
J. W. Martin
Ebeny Ackley
Inventor
Asa L. Darby

UNITED STATES PATENT OFFICE.

ASA L. DARBY, OF WHITE CREEK, ASSIGNOR TO HIMSELF AND JOHN H. BALCH, OF CAMBRIDGE, NEW YORK.

IMPROVEMENT IN HARVESTERS.

Specification forming part of Letters Patent No. 37,253, dated December 23, 1862.

*To all whom it may concern:*

Be it known that I, ASA L. DARBY, of White Creek, Washington county, State of New York, have invented certain Improvements in the Construction of Mowing-Machines; and I declare the following specification, with the drawing connected herewith and forming part thereof, to be a full and complete description of my invention.

The immediate application and adaptation of this invention is to the mowing-machine with reversible cutter and finger bar, for which I obtained Letters Patent dated September 17, 1861; but they are intended to apply as well to all mowers and harvesters to which they can be adapted, of which there are many.

In the different figures of the drawing similar letters denote the same parts of the apparatus.

Figure 1 represents in perspective the framework and so much of the machine as is requisite to show the connection of my improvements therewith.

A is the main frame, supported on its wheels; B, the vibrating frame, carrying the apron E, with its attachments—viz., the finger-bar D, with its fingers F', also the cutter-bar C, with its cutters e.

The apparatus for driving the cutter-bar is not shown.

The finger-bar D is pivoted upon the axle a, upon which it can be turned over from a horizontal position upon the bracket M' to the bracket M²; and the first part of my improvement consists in the apparatus for shifting the finger-bar from the one position to the other, or holding it, as shown in the drawings, at any intermediate position.

S is a shaft extending from the cross-piece or apron E in the direction of the front bar of the frame, its rear journal being supported directly over the axis a and above the port f for the shaft of the crank that operates the cutter-bar. To this shaft is attached a lever, L, connected at its outer end by a cord or chain, b, with the finger-bar, so as to lie about parallel with the bar. By turning the lever it will carry the finger-bar, with its appurtenances, to and from its extreme positions, from bracket M' to bracket M². To maneuver this shaft S there is a second shaft, G, (not seen in Fig. 1, but shown in Fig. 2, which is a profile of the pole P, with its attachments to the main shaft X and frame A.) The shaft G is supported by a standard, H, and hanger J, attached to the pole-framing, and lies parallel with the pole. Its rear end is connected with the front end of shaft S by a universal-joint coupling, U, because the apron E, to which the back end of S is pivoted, being movable in order to enable the cutters to accommodate themselves to the irregularities of the ground, and for other purposes, the shaft S must work out of line with shaft G.

Upon G there is a bevel-wheel, K, fixed upon a sleeve, n, the shaft being held to turn with K by a slot and feather, but free to slide through n as the elevations and depressions of the apron E shall press S backward or forward. Wheel K is geared into a horizontal bevel-wheel, R, fixed upon an upright rod, T, which rises in front of the driver's seat (not shown) and is managed by winch W.

At y is a pawl or stop to hold T, with wheel R, in any required position.

The operation of this apparatus is manifest. This mode of shifting the finger-bar through a circuit of one hundred and eighty degrees has been adopted, since it could not with any convenience be done by any simple lever arrangement so as to be promptly operated by the driver.

My second improvement consists in the employment of an improved finger or cutter guard. This is shaped as shown in Fig. 3, which is a profile view, and Fig. 4, which is a plan view, of the guard, with finger-bar D, cutter-bar C, and cutters e. The guard, being intended, principally, for use with the reversible cutter and finger bar, is similar in figure on both sides of the cutters, and formed as shown by the drawings. Directly in front of the cutter-bar C, and opposite to the rear half of the cutter-blade, the guard opens out into a cylinder or its equivalent, so as to give a free passage to any accumulation of grass, stubble, or other matters that might impede the action of the cutters. The front portions of the blades, as usual, move through a slot, x z, and the movements of the machine are so timed that each stroke of the cutters can be made while it (the machine) moves forward a distance equal to the space from x to z. By this arrangement any fragments of grass, &c., that may pass the front half of the knives will be disposed of before they reach the cutter-bar C, and cannot interfere with its movements.

I am aware that enlargement of jaws, constituting the back ends of the fingers or guards, have been made to free the movements of the cutters from impediments; but it must be particularly noted that they all have reference to obstructions to the cutter-bar, and are made, as in the patent of Kirby, granted in 1856, open above and below the cutter-bar alone.

The front part of the finger or guard is like a bird's bill, with the upper and lower edges, $v$ and $w$, and the center horizontal edges, $v p$, sharp, for the purpose of cutting away any wet or tangled grass, or roots, or vines that might injure or impede the blades in their work. This would be done by the upper ridge and flank edges of what would be the upper part of the guard for the time; hence in non-reversible finger-bars the ridge underneath need not be sharp, but may be flattened down.

What I claim as my invention, and desire to secure by Letters Patent, is—

1. The apparatus for lifting and turning over the finger-bar—to wit, the lever L and chain, with shafts S and G, coupled by a universal joint, and operated by bevel-wheel gear K and R, with shaft and winch, when used in combination with the vibrating frame B, for the purposes set forth in the within specification.

2. The construction of the cutter guard or finger, as described, with the cylindrical opening back of the points of the cutters and forward of the cutter-bar, and providing the front part of the guard with cutting-edges on the upper ridge and flank edges and lower ridge, or on the upper ridge and flank edges alone, for the purpose specified.

ASA L. DARBY.

Witnesses:
J. W. MARTIN,
HENRY ACKLEY.